July 23, 1968 T. W. JUDD 3,394,302
DELAY CIRCUITRY FOR AUTOMATIC BAR CLASSIFIER
Filed March 14, 1966 2 Sheets-Sheet 1

INVENTOR.
TYLER W. JUDD
BY Watts & Fisher
ATTORNEYS

INVENTOR.
TYLER W. JUDD
BY
Watts & Fisher
ATTORNEYS

United States Patent Office 3,394,302
Patented July 23, 1968

3,394,302
DELAY CIRCUITRY FOR AUTOMATIC
BAR CLASSIFIER
Tyler W. Judd, Chardon, Ohio, assignor to Republic Steel Corporation, Cleveland, Ohio, a corporation of New Jersey
Filed Mar. 14, 1966, Ser. No. 534,033
10 Claims. (Cl. 324—37)

The present invention relates to the detection of defects in metallic workpieces and more particularly relates to apparatuses for detecting and marking the location of defects in the workpieces.

In the mnufacture of wire, bars, and other metallic workpieces, one problem has been the detection of seams and other defects and marking those locations so that they are easily locatable by either visual inspection or suitable equipment. In the case of heavy workpieces, such as bars, it is often necessary that the marks indicating locations of the defects be readily visually observable for subsequent removal of the defects to salvage the bar. In the case of lighter workpieces, such as wire, the mark must often be detectable by automatic rejection equipment.

Defect detection methods using visual inspection do a remarkable job of finding seams, even though this type of defect may be tightly closed and obscured by scale. However, prior visual and manual methods of detecting and marking defects are subject to human error and do not generally detect those defects which are completely hidden and provide no indication of their presence on the surface of the bar. In addition, these prior manual methods cannot dependably determine seam depth and are time consuming and cumbersome.

One suitable apparatus for detecting and marking the location of defects on workpieces is described in U.S. Patent No. 3,180,230 to T. W. Judd et al. The patented defect marking apparatus includes a rotating cutter which is movable to engage the workpiece and cut an impression therein, but is normally biased out of engagement with the workpiece. The cutter has the advantage of providing a permanent and easily visible mark on the workpiece which satisfactorily penetrates rust, scale, and the like, particularly in the case of hot rolled bars. An actuator is adapted to move the cutter into the workpiece for the duration of an energizing pulse introduced into the input of the actuator. Defect detection equipment is disposed adjacent the workpiece ahead of the cutter and produces a defect signal each time a defect is detected. Where the workpieces are round bars, the detection equipment and the workpiece are relatively rotatable such that the detection equipment describes a helical path around the moving workpiece. A control circuit is connected to both the detection equipment and the actuator and for each defect signal received, it introduces an energizing signal to the actuator with the result that the cutter momentarily engages the workpieces at least once for each signal pulse received.

The marker or rotating cutter is placed behind or "downstream" of the defect detection equipment and on a longitudinal line on the same side of the bar. The longitudinal spacing between the marker and the detection equipment is set at a convenient value, for example, three inches. The bar travel through the apparatus is helical and forward bar travel per revolution is maintained equal to the spacing between the marker and the detection equipment. Upon receiving a defect signal from the detection equipment, the marker control unit delays sending an energizing signal to the actuator for the time period of one bar revolution. Since forward bar travel per revolution is equal to the spacing between the detection equipment and the marker and the energizing signal is delayed for the period of one revolution of the bar, then the mark made by the cutter will fall exactly on the location of the defect.

In use, it has been found that more than one defect often occurs during the delay period and will not be marked unless taken into account. It is therefore necessary that the system be capable of accommodating more than one defect signal and delaying more than one defect signal at any given time. It is also necessary that the delay time be very precise. Conventional delay devices are not entirely suitable and capable of meeting these criteria.

One apparatus found suitable for providing the delay is described in the U.S. Patent No. 3,180,230. The patented system accommodates the additional defect signals during the delay period by providing a control circuit having a plurality of time delay circuits and a counting circuit to sequently separate the defect signals into the various time delay circuits. The number of time delay circuits is directly related to the maximum number of defects likely to occur during the delay period. The outputs of the time delay circuits are connected to sequentially energize the actuator in a time-spaced relation identical to the timed spacing of the defects as detected by the detection equipment.

The present defect detecting and marking system uses a plurality of time delay channels and a gating circuit which selects which of the delay channels receives each input defect pulse. The gate circuit always selects the first delay channel if the first delay channel is not in the process of delaying or timing out a delay cycle and can receive the defect pulse. If the first delay channel is occupied and in the process of delaying when a second defect signal arrives at the gate, then the gate circuit directs this defect signal to the second delay channel. If both the first and second delay channels are in the process of delaying when the next defect signal arrives at the gate, then the gate will pass it on to a third defect channel. As many defect channels are used as defects are likely to occur during the delay period. For purposes of simplicity, the remainder of the description is directed to a plurality of two delay channels.

The present marker control system is greatly simplified and is capable of providing extremely precise delays on all channels. In addition, a substantial majority of the defect signals are acted upon by the same delay channel. This reduces mark positioning errors between delay channels which result if all delay channels are not adjusted for precisely the same time delay. Thus, a substantial majority of the delay signals will be given exactly the same precise delay.

Objects and a fuller understanding of the invention may be had by referring to the following description and claims taken in conjunction with the drawings in which:

Figure 2:
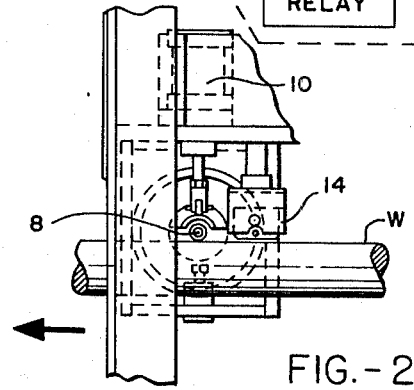
FIGURE 2 is an elevational view, taken transverse to longitudinal workpiece movement, of a suitable marking apparatus for use with the defect detection and marking control system of the present invention.
Figure 3:
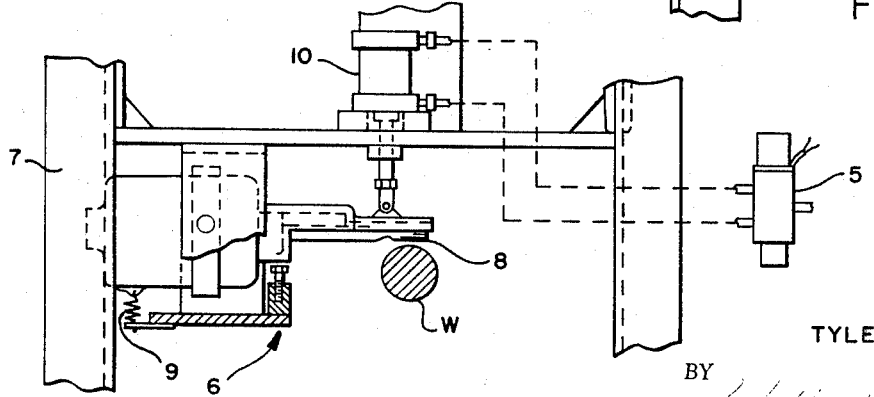
FIGURE 3 is a side elevational view taken parallel to the path of workpiece movement of the marking apparatus of FIGURE 2.

Referring now to the drawings and to FIGURES 2, 3 in particular, a marker assembly 6 is carried by a support frame 7 for marking defects in a workpiece W. The marker assembly 6 includes a motor driven carbide cutter 8 which is pivotally carried by the frame 7 and is disposed over the workpiece W. A spring 9 biases the carbide cutter 8 normally out of engagement with the workpiece W. A cylinder 10 is carried by the frame 7 and has a piston rod connected to a shaft collar just above the cutter 8 and causes the cutter to engage the workpiece W each time the cylinder 10 is activated by a suitable control such as a solenoid actuated air valve 5. An inspection probe including a search coil 14 is positioned ahead of the cutter 8 relative to the longitudinal moving workpiece W, so as to detect defects in the workpiece ahead of the cutter so that the cutter is in a position to mark each defect detected.

Figure 1:
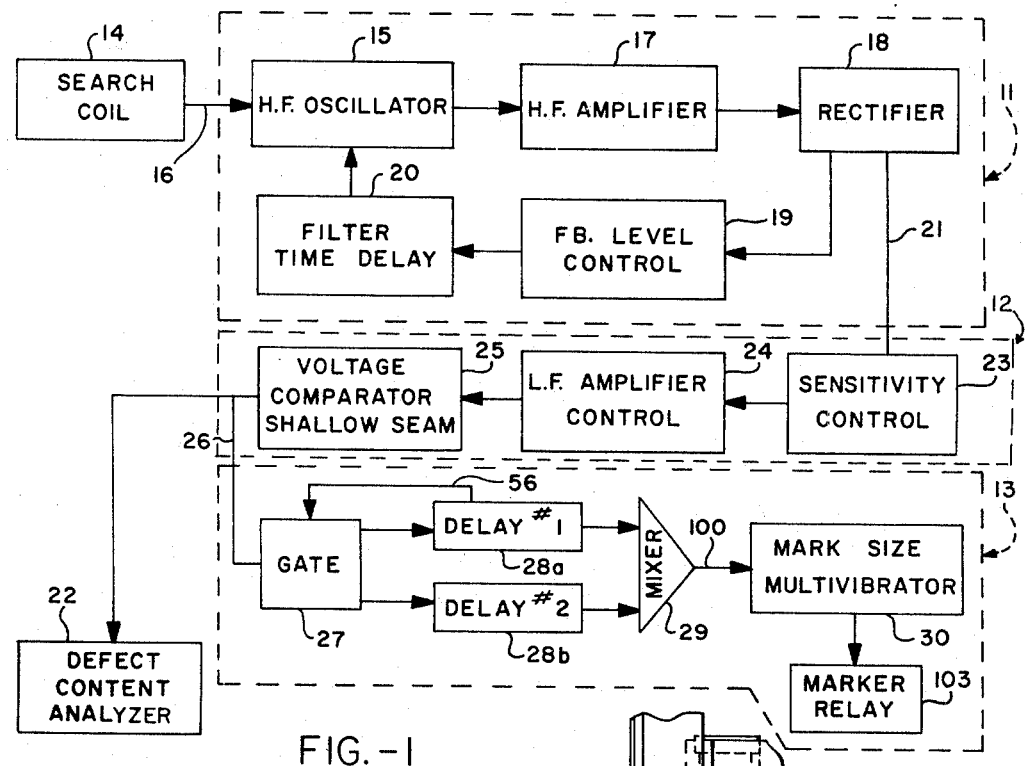
FIGURE 1 is a schematic block diagram of the defect detection and marking system of the present invention.

Referring to FIGURE 1, the present control system includes three basic units, a detector unit 11, a classifier control unit 12, and a marker control unit 13. The detector unit 11 produces defect signals which are proportional to the magnitude of defects detected by the search coil 14. The details of the detector unit 11 are explained fully in Patent No. 2,832,040, issued to William C. Harmon, and will be described briefly here.

The search coil 14 is connected to a high frequency oscillator 15 by means of a cable 16 and constitutes a primary frequency determining element for the oscillator 15. As described in the above referenced patent, the oscillator 15 includes two separate stages, an amplifier stage and a feedback stage, so that separate control of feedback may be obtained. High frequency alternating voltages generated by the oscillator are transmitted to a high frequency amplifier 17. The alternating voltages at the output of the amplifier 17 are transmitted to a rectifier 18 and the rectified voltages at the output of the rectifier are returned to the oscillator 15 through a feedback level control 19 and a filter time delay 20. The rectified voltages are utilized to bias the feedback stage of the oscillator 15 in order to maintain the amplitude level of the oscillator substantially constant except for changes produced when a defect such as a seam is encountered as the workpiece W moves relative to the search coil 14. The filter 20 functions as an integrating device so that only voltage pulses greater than a predetermined duration are imparted to the oscillator 15 while the feedback level control 19 functions as a means of controlling the amplitude of the feedback voltage. The output of the detector unit 11 is a bi-polar wave form, the amplitude of which is approximately proportional to the depth of the defect in the workpiece. This wave form is introduced into the low frequency classifier unit 12 via a line 21.

The details of the classifier control unit 12 are explained fully in patent application, Ser. No. 365,097, filed May 5, 1964, entitled, "Apparatus for Defect Analysis and Classification of Workpieces," by Joseph M. Mandula et al., now Patent No. 3,263,809, issued August 2, 1966. In the latter patent, the classifier control unit contains two channels, a shallow defect channel and a deep defect channel. The two channels are substantially identical in construction and operation and examine the defect signals produced by the defect detector unit 11 and separate the defect signals according to defect severity as either a shallow defect signal or a deep defect signal. The shallow defect channel produces defect signals for each defect detected whether shallow or deep. The deep defect channel produces defect signals for only the deep defects detected. The outputs of the two channels are introduced to a defect analyzer control unit 22 which analyzes the defect signal information and classifies the workpieces as either good, salvage, or scrap according to the number and length of deep defects and shallow defects detected.

The output of the shallow defect channel of the classifier control unit is introduced to a marker control unit 13 so that each defect detected whether shallow or deep is marked. Since the marker control unit 13 is controlled by the output of the shallow defect channel only, only this channel is shown in the drawing. The shallow defect channel portion of the classifier control unit 12 consists of a sensitivity control 23, a low frequency amplifier 24 and a voltage comparator 25. The function of the voltage comparator is to produce fast-rise pulses which are required to operate subsequent units in the defect analyzer 22 at a certain fixed voltage level on the input wave form. The comparator 25 produces an output pulse when the input of the classifier control unit exceeds a certain threshold level. The threshold level of the deep defect channel comparator unit is higher than that of the shallow defect channel comparator unit so that the deep defect channel produces an output pulse for deep defects only and the shallow defect channel produces an output pulse for both the shallow and deep defects. The output of the shallow defect voltage channel is introduced to the marker control unit via a line 26.

Each defect signal from the shallow defect channel of the classifier unit is a positive voltage pulse which is introduced into the input of a gate circuit 27. The gate circuit 27 selects which of a plurality of delay channels 28a, 28b will receive the input defect pulse. Selection is dependent upon whether the first delay channel 28a has already received a defect pulse and is in a process of running through a delaying time cycle when an input again arrives at the input of the gate circuit 27.

If the first delay channel is inactive and not running through a delaying cycle, then the gate circuit 27 always sends the defect signal to the first delay channel. If the first delay channel 28a has recently received a defect signal and is still running through a delaying cycle, then the second delay channel 28b is selected by the gate circuit 27 to receive the next defect pulse. Thus, all defect signals will be sent to the first delay channel 28a except those arriving when the first delay channel is still in a delay cycle. At the end of their delay cycles, the delay channels 28a, 28b produce trigger pulses in response to the defect pulses received at their inputs. The outputs of all the delay channels 28a, 28b are introduced to a mixer circuit 29 which passes trigger pulses from either of the delay channels to the input of a "mark size" multivibrator 30. Each time the mark size multivibrator receives a trigger pulse from the mixer circuit 29, it produces an energizing signal for a preadjusted period depending upon the size of the mark desired. The energizing signals from the output of the multivibrator 30 are introduced to an energize a marker relay coil 103 which closes its contacts to energize the solenoid of the control valve 5 to cause the carbide cutter 8 to engage the workpiece W for the period or duration of the energizing signal from the multivibrator 30.

Figure 4:
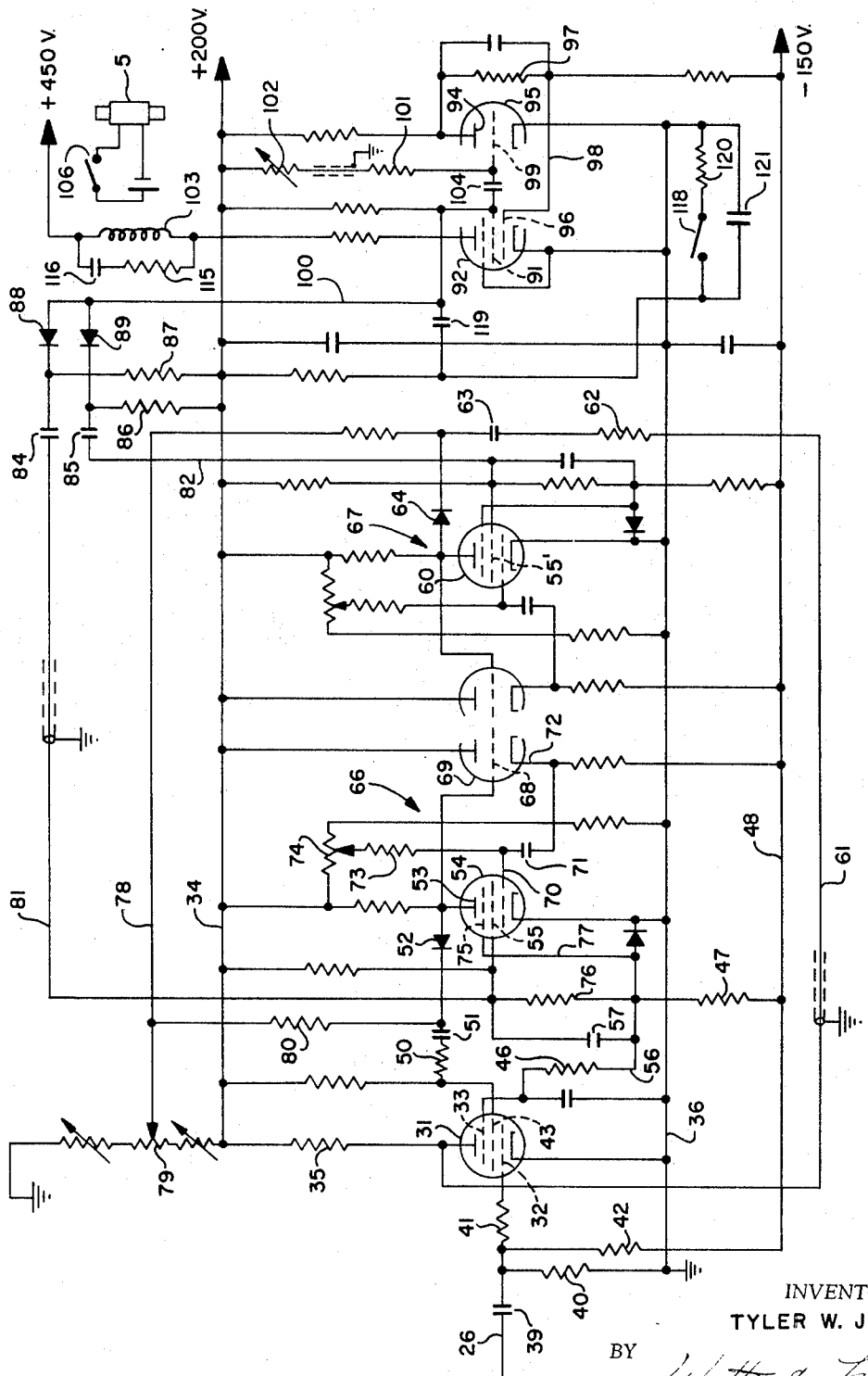
FIGURE 4 is a detailed schematic diagram of the electrical circuit of a marker control unit of the control system of FIGURE 1.

Referring to FIGURE 4, a pentode tube 31 is provided in the gate circuit 27 to provide a gating function. The pentode tube 31 is utilized because of its ability to cut off and control plate current by means of either its control grid 32 or its suppressor grid 33. A preferred pentode is commonly designated as No. 5725.

The plate of the pentode 31 is connected to a 200 volt DC supply conductor 34 through a plate load resistor 35. The cathode of the pentode tube 31 is connected to a grounded conductor 36.

The positive going pulse from the voltage comparator 25 of the classifier control unit 12 is introduced by conductor 26 and is differentiated by a capacitor 39 and a resistor 40. The differentiated pulse is than introduced to the control grid 32 of the pentode through an isolation resistor 41.

The pentode tube 31 is normally in a cut-off condition due to a voltage divider action of the resistor 40 and a resistor 42. The differentiated input signal pulse brings the pentode tube 31 out of cut-off causing a negative pulse to appear at its screen grid 43. Although the tube 31 is brought out of cut-off, no signal in the form of a voltage change appears at the plate of the tube 31 because the suppressor grid 33 remains at its normal negative potential via resistors 46, 47 connected to a negative 150 volt source via conductor 48. The negative potential on the suppressor grid 33 prevents the flow of current to the plate of the pentode tube 31.

The negative voltage pulse appearing on the screen grid 43 passes through an isolation resistor 50 and a capacitor 51 to a diode 52 polarized so as to pass the negative going portion of the signal pulse to the plate 53 of a first phantastron tube 54 in the first delay channel 28a. The negative going portion triggers the phantastron tube 54 and its screen voltage rises. The phantastron tube 54 starts running through its timing action to provide the delay desired. The rise in the voltage on a screen grid 55 of the phantastron 54 causes the voltage on the suppressor grid 33 of the pentode gate tube 31 to rise because of their interconnection via conductor 56, resistor 76, and the resistor 46. This rise in voltage on suppressor grid 33 is an interlock signal to the gating circuit 27 that the first delay channel is delaying a defect signal.

In the event that the first phantastron 54 of the first delay section has not finished its timing cycle when another positive input signal pulse appears on the conductor 26 from the classifier control unit 12, then that input signal pulse will cause a negative going voltage signal to appear at the plate of the gating tube 31 because the suppressor grid 33 of the gating tube 31 is no longer negative. The negative going signal on the plate of the tube 31 triggers a second phantastron tube 60 via a conductor 61, an isolation resistor 62, a capacitor 63 and a diode 64, polarized so as to pass the negative voltage to the plate of the phantastron 60. The negative voltage at the plate of the phantastron 60 triggers the tube 60 so that it commences running out its time delay cycle.

The delay times provided by the first and second delay channels are determined by the characteristics of the circuit elements of phantastron circuits 66, 67 for the phantastron tubes 54, 60 respectively. The phantastron circuits 66, 67 are substantially identical and only the phantastron circuit 66 will be described in detail.

In the phantastron circuit 66, the timing action is initiated by the negative trigger applied to the plate 53 of the phantastron tube 54. The plate 53 is direct coupled to the control grid 68 of a cathode follower which is one-half of a dual triode tube 69, preferably a tube designated as 5814. The conventional cathode follower action transfers the negative trigger pulse to a control grid 70 of the phantastron tube 54 via a capacitor 71 connected between the control grid 70 and the cathode 72 of the tube 69.

The control grid 70 of the phantastron tube 54 is normally slightly positive by reason of the bias provided by resistor 73 and potentiometer 74 connected to the positive power supply conductor 34. The negative trigger voltage supplied to the control grid 70 of the phantastron tube 54 causes a reduction in the current on the screen grid 55. This causes the voltage on the screen grid 55 to rise. The screen and suppressor grids 55, 75 are coupled together by a resistor 76 and conductor 77 so that the rise in screen voltage is transferred to the suppressor grid 75, causing the voltage on the suppressor grid to rise also. The rise in the suppressor grid voltage brings the suppressor grid 75 above the point of plate current cut-off. The plate current flows thereby reducing the plate voltage. The voltage change on the plate of the phantastron tube 54 is coupled back to the control grid 70 of the phantastron tube via the cathode follower tube 69, lowering the control grid voltage and causing a further reduction in the screen current and a further rise in screen voltage. This action initiates the generation of a linear saw tooth at the plate.

The linear saw tooth is generated by the capacitor 71 connected to the control grid of the phantastron tube starting to discharge through the resistor 73. As the capacitor 71 discharges, the grid end of the resistor 73 becomes more positive. This increases the plate current of the phantastron tube 54 causing a drop in the plate voltage. The drop in the plate voltage has an effect opposite to that of the discharge current from the capacitor and is thereby degenerative in action. The dropping plate voltage tends to drive the control grid negative, but since the plate 53 cannot drop sufficiently to exceed the positive change at the control grid 70 because it is the control grid going positive that makes the plate voltage drop, the plate voltage drop tends to counteract the effect of the capacitor discharge effectively increasing the discharge time.

This action continues until the plate current levels off and the plate voltage cannot decrease further. This point is generally described as the tube bottoming. With the degenerative effect of the plate voltage dropping now gone, the discharge of capacitor 71 raises the control grid voltage rapidly. The screen current now increases, dropping the screen voltage which in turn drops the voltage on the suppressor grid 75. Reduction of the suppressor grid voltage causes a reduction in plate current which causes an increase in plate voltage. This, in turn, causes the control grid voltage to rise even further. This action is regenerative and the suppressor grid is rapidly driven negative, cutting off the plate current completely.

With the plate current cut off, the plate voltage rises toward the 200 volt supply on conductor 34 but is clamped to a control voltage on conductor 78 by the action of the diode 52 in the plate circuit of the phantastron tube 54. The control voltage on the conductor 78 is varied by a potentiometer 79 to vary the delay time of the phantastron circuit to permit the system to accommodate different diameter bars or other workpieces. Increasing the control voltage on the conductor 78, increases the delay time as the voltage on the plate has longer to run down before the tube bottoms.

In the phantastron circuit 66 shown, the delay time is linear with respect to the setting of the potentiometer 79. A resistor 80 between the diode 52 and the control conductor 78 increases or raises the effective impedance of the control voltage source provided by the conductor 78.

In the present phantastron circuit 66, the slope of the timing wave form is controlled by returning the control grid resistor 73 to the movable arm of the potentiometer 74 which forms part of a voltage divider. The connection of the grid resistor 73 to this point of variable voltage provided by the potentiometer, provides a fine adjustment on the delay time so that all the delayed channels can be synchronized.

The cathode follower provided by the triode section 69 provides a low impedance for recharging the capacitor 71. This arrangement decreases the recovery time of the phantastron circuit 66 to a very low value.

The resulting rectangular control pulse produced on the screen grid 55 of the phantastron tube 54 and the screen grid 55' of the phantastron tube 60 are introduced via conductors 81, 82 respectively, to the mixing circuit 29.

The mixing circuit 29 includes capacitors 84, 85 and resistors 86, 87 connected to the conductors 81, 82 respectively to form differentiating circuits for each of the two input conductors. The square wave pulses introduced on the conductors 81, 82 are therefore differentiated and the negative going portions only are passed by diodes 88, 89, as trigger pulses to the multivibrator 30 via the conductor 100.

The diodes 88, 89 also provide circuit isolation because the anode potentials of the diodes drop below their cathode potentials during the period of operation of the multivibrator 30. Therefore, once the multivibrator has been triggered, it is isolated from the two phantastron circuits 66, 67 in the delay channels 28a, 28b respectively. The diodes also function in a like manner to isolate the two phantastron circuits from each other.

The monostable multivibrator 30 is of the plate coupled variety. It differs from the conventional form in that a screen grid 91 of a pentode half 92 of a two section tube is used as one plate, and a plate 94 of a triode half 95 is used as the other plate of the multivibrator. This permits the plate of the pentode half 92 to be isolated from the timing action of the multivibrator circuit. A preferred pentode tube is a 6U8.

The negative trigger pulses passed to the conductor 100 by the diodes 88, 89 in the mixer circuit 29, are introduced to the screen grid 91 of the pentode 92. Initially, the multivibrator 30 is in its stable state with the triode section or half 95 conducting. The pentode half or section 92 is normally cut off because of the DC coupling between the plate 94 of the triode section 95 and the control grid 96 of the pentode section 92 via resistor 97 and conductor 98. A negative trigger pulse supplied to the screen grid 91 of the pentode section 92 is coupled to the control grid 99 of the triode section 95 via a timing capacitor 104. As the control grid 99 of the triode section 95 is driven negatively, the voltage at its plate 94 rises. Hence, the voltage at the pentode control grid 96 rises causing the pentode section 92 to conduct. As the pentode section 92 conducts, its screen grid voltage drops. This voltage drop is coupled to the triode section by the timing capacitor 104. Because of this regenerative action, the triode section is rapidly cut off. As the timing capacitor 104 discharges through a resistor 101 and a potentiometer 102, the control grid 96 of the triode section 95 rises until it reaches a point where the triode section again conducts. When the triode section conducts, a regenerative action rapidly returns the circuit to its original state.

The period of the multivibrator is determined by the time constant of the capacitor 104 and the resistance in the control grid circuit. The control grid resistance can be changed by varying the potentiometer 102, thus changing the period of the circuit. Plate current in the pentode section 92 is coincident with screen current. Thus, when the pentode section conducts, plate current flows energizing a relay coil 103 for a time equal to the period of the multivibrator. The energized relay coil closes its contacts 106 to energize the operating solenoid in valve 5 thereby actuating cylinder 10 to move the cutter 8 against the workpiece W for the period of the multivibrator 30.

In a preferred form of the control system of the present invention, the time constants have been chosen so that the relay coil 103 is energized for a period between 15 and 66 milliseconds depending upon the size of mark desired as determined by the setting of the potentiometer 102.

A resistor 115 and a capacitor 116 connected across the relay coil 103 shunt the coil and reduce transient voltages that would otherwise occur each time the relay coil 103 is de-energized. A "mark test" pushbutton switch 118 is provided in the multivibrator circuit 30 for testing purposes. Each time the pushbutton switch 118 is closed, the multivibrator 30 is triggered due to coupling through a capacitor 119. The resistor 120 in series with the switch 118 and a capacitor 121 across the series connected resistor and switch 118 prevent the occurrence of spurious pulses due to bouncing of the contacts of the switch 118.

Thus, each time the detection unit 11 produces a defect signal which is eventually introduced to the gate circuit 27, the gate circuit 27 always introduces or sends the resulting control signal to the first delay channel 28a to initiate its timing action. If the first delay channel is already running through a timing cycle, this condition is indicated to the gate circuit via a control signal on the conductor 56 and the gate circuit 27 then sends the next control pulse resulting from another input defect signal to the second delay channel 28b. The second delay channel 28b is then triggered to start its timing action and produces a delayed control signal at the end of its predetermined delay time. The control signals from the outputs of the delay circuits 28a, 28b are introduced to the mixer circuit 29 which differentiates the control signals and passes them as trigger pulses to the input of the monostable multivibrator 30 via the conductor 100. Each trigger pulse triggers the monostable multivibrator to produce an output energizing signal to the defect marker for a predetermined period depending upon the size of the mark desired.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:
1. Apparatus for detecting and marking defects in a longitudinally moving workpiece comprising:
   (a) a defect detector for detecting defects in the longitudinally moving workpiece and providing a defect signal at its output in response to each defect detected;
   (b) a gating circuit having an input connected to the output of the defect detector for receiving defect signals therefrom, and a plurality of outputs;
   (c) a like plurality of delay circuits having inputs connected to the outputs of the gating circuit, each delay circuit providing a defect signal at its output a predetermined time after receiving a defect signal at its input;
   (d) a workpiece marking means for marking workpieces in response to an energizing signal at its input;
   (e) circuit means connecting the input of the workpiece marking means to the outputs of the delay circuits; and,
   (f) said gating circuit selecting its output connected to a first of the delay circuits for transmitting defect signals thereto except when said first delay circuit is delaying a defect signal in which event the gating circuit selects the next succeeding output connected to the next succeeding delay circuit so that said gating circuit selects an output connected to succeeding delay circuits only when all of the preceding delay circuits are delaying defect signals.

2. The apparatus of claim 1 wherein the delay circuits are phantastron circuits.

3. The apparatus of claim 1 wherein said circuit means includes a single shot multivibrator circuit having an adjustable output for producing energizing signals of a preadjusted duration in response to the defect signals introduced at its input.

4. The apparatus or claim 3 wherein said circuit means includes a diode mixing circuit having a plurality of diodes poled to pass the defect signals to the input of the multivibrator circuit and to isolate the multivibrator circuit when operating from the delay circuit means.

5. Apparatus for detecting and marking defects in a longitudinally moving workpiece comprising:
   (a) a defect detector for detecting defects in the longitudinally moving workpiece and providing a defect signal at its output in response to each defect detected;
   (b) a gating circuit having an input connected to the output of the defect detector for receiving defect signals therefrom, and a plurality of outputs;
   (c) a like plurality of delay circuits having inputs connected to the outputs of the gating circuit, each delay circuit providing a defect signal at its output a predetermined time after receiving a defect signal at its input;
   (d) a workpiece marking apparatus for marking workpieces in response to an energizing signal at its input;
   (e) circuit means connecting the input of the workpiece marking means to the outputs of the delay circuit; and,
   (f) an interlock circuit connecting the first delay circuit to the gating circuit and indicating to the gating circuit when the first delay circuit is delaying a defect signal so that said gating circuit transfers a defect signal to a first of the delay circuits except when said first delay circuit is delaying a defect signal in which event the gating circuit transfers a subsequent defect signal to the next succeeding delay circuit and said gating circuit transfers a defect signal to succeeding delay circuits only when all of the preceding delay circuits are delaying defect signals.

6. The apparatus of claim 5 wherein the gating circuit comprises a pentode having its control grid connected as the input of the gating circuit, its suppressor grid connected to a negative potential so as to normally hold the plate circuit of the pentode in a non-conducting state, its screen grid connected as the first outptu to hte input of the first delay circuit, and its plate circuit connected as a second output to the input of the second delay circuit, and the interlock circuit being connected to the suppressor grid to drive the suppressor grid positive when the first delay circuit is delaying a defect signal.

7. Apparatus for detecting and marking defects in a longitudinally moving workpiece comprising:
   (a) a defect detector closely associated with a longitudinally moving workpiece for detecting defects in the workpiece and producing defect signals in response to each defect detected;
   (b) a marker located behind the defect detector relative to the moving workpiece so as to mark the workpiece in response to an energizing signal introduced at its input;
   (c) a plurality of delay channels for producing trigger signals at their outputs a predetermined time after defect signals are introduced to their inputs, the predetermined time of each delay channel being substantially the period required for a predetermined point on the workpiece to travel from the defect detector to the defect marker;
   (d) circuit means connecting the outputs of the delay channels to the defect marker so as to provide an energizing signal to the marker for each trigger signal produced by the outputs of the delay channels;
   (e) a gating circuit having an input connected to the defect detector to receive defect signals therefrom and a plurality of outputs connected to the inputs of the delay channels;
   (f) interlock circuit means connected from at least all but the final delay channel to the gating circuit means for providing an interlock signal to the gating circuit from each delay channel which is operating to provide a trigger signal at its output; and,
   (g) said gating circuit providing defect signals to the inputs of a first of the delay channels as long as no interlock signal is provided to the gating circuit by the first delay channel.

8. The apparatus of claim 7 wherein the delay channels means are phantastron circuits.

9. The apparatus of claim 7 wherein said circuit means includes:
   (i) a single shot multivibrator circuit having an adjustable output for producing energizing signals of a predetermined and preadjusted duration in response to the trigger signals introduced at its input; and,
   (ii) a diode mixing circuit having a plurality of diodes poled to pass the trigger signals to the input of the multivibrator and to isolate the multivibrator when operating from the delay channels.

10. The apparatus of claim 9 wherein the gating circuit means comprises a pentode having its control grid connected as the input of the gating circuit means, its suppressor grid connected to a negative potential so as to normally hold the plate circuit of the pentode in a non-conducting state, its screen grid connected as a first output to the input of the first delay channel, and its plate circuit connected as a second output to the input of the second delay channel, the interlock circuit means being connected to the suppressor grid to drive the suppressor grid positive when the first delay channel is operating.

References Cited
UNITED STATES PATENTS 3,180,230   4/1965   Judd et al. _____ 324—37 X
3,290,167   12/1966  Wood et al. _____ 324—37 X RUDOLPH V. ROLINEC, *Primary Examiner.*

P. A. URIBE, *Assistant Examiner.*